(12) United States Patent
Al Ghatta et al.

(10) Patent No.: US 7,226,648 B2
(45) Date of Patent: Jun. 5, 2007

(54) FLEXIBLE BOTTLES OF POLYESTER RESIN

(75) Inventors: Hussain Al Ghatta, Fiuggi (IT); Sandro Cobror, Pozzilli (IT)

(73) Assignee: Cobarr, S.p.A., Anagni (IT)

( * ) Notice: Subject to any disclaimer, the term of this patent is extended or adjusted under 35 U.S.C. 154(b) by 238 days.

(21) Appl. No.: 10/484,009

(22) PCT Filed: Jul. 12, 2002

(86) PCT No.: PCT/EP02/07790

§ 371 (c)(1), (2), (4) Date: Jan. 15, 2004

(87) PCT Pub. No.: WO03/008293

PCT Pub. Date: Jan. 30, 2003

(65) Prior Publication Data

US 2004/0209022 A1 Oct. 21, 2004

(30) Foreign Application Priority Data

Jul. 16, 2001 (IT) .......................................... MI01A1510

(51) Int. Cl.
*B65D 1/00* (2006.01)

(52) U.S. Cl. ..................................... 428/34.2; 428/35.7

(58) Field of Classification Search ................ 428/34.2, 428/35.7, 229, 480, 36.9, 36.12
See application file for complete search history.

(56) References Cited

U.S. PATENT DOCUMENTS

| | | | |
|---|---|---|---|
| 4,696,840 A | | 9/1987 | McCullough et al. |
| 5,039,780 A | * | 8/1991 | Hashimoto et al. ......... 528/194 |
| 5,556,675 A | * | 9/1996 | Yamamoto et al. ...... 428/36.92 |
| 5,614,148 A | * | 3/1997 | Beck et al. ................. 264/532 |
| 6,245,863 B1 | * | 6/2001 | Al Ghatta ................... 525/437 |

FOREIGN PATENT DOCUMENTS

| | | | |
|---|---|---|---|
| DE | 445213 A1 | | 6/1996 |
| EP | 0 516 021 A2 | | 12/1992 |
| EP | 0 786 414 A1 | | 7/1997 |
| EP | 0 700 837 A2 | | 3/1999 |
| EP | 0 964 031 A2 | | 12/1999 |
| GB | 2357491 A | * | 6/2001 |
| JP | 57068360 A | * | 4/1982 |
| JP | 10095903 A | * | 4/1998 |

* cited by examiner

*Primary Examiner*—Sandra Nolan Rayford
(74) *Attorney, Agent, or Firm*—Edwin A. Sisson, Attorney at Law, LLC

(57) ABSTRACT

Flexible, liquid fillable bottles of polyester resin are provided which have a capacity in liters relative to the weight thereof in grams excluding the neck of from 0.15 to 0.5 and from 0.2 to 1.5 for larger capacities. The bottles are obtained by blowing parisons freely or in a rigid container, the shape of which the bottles assume, said parisons being of polyester resin with suitable rheological properties.

20 Claims, No Drawings

FLEXIBLE BOTTLES OF POLYESTER RESIN

The present invention relates to flexible, liquid-fillable bottles of polyester resin which have no welded seams, are provided with a closable neck for filling and emptying the liquid and to the use of the bottles inside rigid containers capable of providing in particular mechanical resistance to the stresses to which the liquid-filled bottle may be subjected.

Hitherto known liquid-fillable flexible plastic bags (pouches), of an appreciable capacity relative to the weight of the bag, which are used inside rigid containers capable of absorbing impacts which the liquid-filled bag is not capable of withstanding without breaking, are obtained from single-layer or multilayer, generally multilayer, plastic sheet or film, or from tubular material, by means of welding operations.

In the case of sheet or film, at least three welded seams are required to obtain the bag (one parallel to the axis of the bag, the others perpendicular one to the other), while at least two are required for tubular material.

In many instances, the bags must be provided with a neck for filling and emptying of the liquid; in this case, a welded seam is required to attach the neck.

The welded seams constitute possible points of liquid leakage, especially at the corners, if the welded seam is not perfect. Moreover, the bags contain a layer of an easily weldable material on the inside which differs from the other materials; this restricts the choice of polymers which may be used for the production thereof.

The need has arisen in the sector to provide flexible bottles for liquids, of an appreciable capacity relative to the weight thereof, which do not require the use of welded seams for the production thereof and which do not exhibit the problems typical of hitherto known bags.

It has now unexpectedly been found that it is possible to provide flexible, liquid-fillable bottles which do not require the use of welded seams for the production thereof, provided with a closable neck for filling and emptying of the liquid, having a capacity of 2 or more liters, and possibly as much as 30–40 liters or more, in which the ratio between the capacity in liters and the weight of the bottles in grams (excluding the neck) is in the range from 0.15 to 0.5 for capacities of up to 5 liters and from 0.2 to 1.5 for capacities of greater than 5 liters.

The bottles are obtained by blowing parisons of aromatic polyester resin having an intrinsic viscosity of 0.7 to 0.85 dl/g and rheological properties such that the parisons may be blown until the desired volume relative to weight is obtained.

Blowing is performed in the absence of a mould suitable for imparting a shape to the bottle (free blowing) or by blowing the parison inside a rigid container, the geometry of which is assumed by the bottle.

In the second case, it is possible to blow the parisons to relatively small thickness, for example of 30–50 μm, since the impacts to which the liquid-filled bottle may be subjected, for example dropping during transport or the like, are prevailing absorbed by the container.

The containers in which the bottles of the invention may be inserted may be of any shape and material, such as for example paperboard, plastics and metals, and have the shape of a box or any other geometric shape, selected in particular to facilitate transport. The bottles may, for example, be blown inside metal barrels, such as for example the kegs used for the transport and storage of beer, in which case using the bottles makes it possible to use lowcost metals because the bottle with which the liquid comes into contact is entirely inert and to avoid cleaning and sterilisation operations when the keg is returned for refilling because the bottle is removed and replaced with a new one.

The bottles obtained by free blowing are cylindrical in shape; when the parison is blown inside rigid containers, the bottle assumes the geometry of the container.

The parisons are blown according to known methods, for example by injecting air at a pressure of several ATA so as to achieve the desired expansion.

After blowing, the bottle is conveniently subjected to thermal stabilisation (heat setting) treatments in order reduce shrinkage/distortion phenomena at elevated temperatures, said treatments consisting of heating the bottle with infrared or other lamps in order to raise the surface temperature to 160–170° C. for 5–10 seconds or of blowing the parison in a preheated mould.

Bottles stabilised in this manner can withstand hot filling at 90° C. for 5 minutes without suffering major distortion and may thus be used for hot-fill applications.

Since the bottles are blown at a temperature slightly above the Tg of the resin, the bottles are biaxially oriented and thus provided with good mechanical properties which allow a 15 l capacity bottle filled with water to withstand a drop of 1.5 m without breaking.

Bottles with a capacity of greater than 15 l can be filled with liquids, but cannot withstand a 1.5 m drop due to their very thin thickness.

While being flexible, the bottles are capable of maintaining the shape they attain when completely filled with air. The bottles moreover exhibit considerable transparency, which makes it possible, inter alia, to see the liquid contained in the bottle when inserted in an opaque container through windows cut in the container.

As already indicated, the aromatic polyester resins used for the production of the parison have rheological properties which permit the parisons to be blown without breaking until the desired volume relative to weight, as stated above, is achieved.

Preferred resins are copolyethylene terephthalates in which from 2 to 20 mol % of units derived from terephthalic acid are replaced with units derived from isophthalic acid and/or naphthalenedicarboxylic acids.

These resins are produced using known methods by polycondensing ethylene glycol with mixtures of terephthalic acid with isophthalic and/or naphthalenedicarboxylic acid used in quantities of from 2 to 20 mol % relative to the mixture.

Preferred copolyethylene terephthalates are those containing 10–15 mol % of units derived from isophthalic and/or naphthalenedicarboxylic acid.

The intrinsic viscosity of the resins is between 0.7 and 0.85 dl/g (viscosity determined in a solution of 0.5 g of resin in a 60:40 mixture by weight of phenol and tetrachloroethane at 25° C. according to ASTM 4063-8G). The viscosity is increased to the above values from the viscosity of approx. 0.4 to 0.65 dl/g of the resin obtained from melt polycondensation by means of solid-state polycondensation, preferably carried out in the presence of pyromellitic dianhydride introduced in percentage content of less than 0.1 wt. %.

Besides pyromellitic dianhydride, it is also possible to use any other dianhydride of a, preferably aromatic, tetracarboxylic acid.

Examples are the dianhydrides of 3,3',4,4'-biphenyltetracarboxylic acid, 3,3',4,4'-dibenzophenoxytetracarboxylic acid and bis(3,4-dicarboxyphenyl) ether.

The dianhydride may be added in the form of a masterbatch in polycarbonate resin.

The resin used for the production of the parisons may be used as a blend with other polymers, preferably those which are compatible therewith, such as for example aliphatic polyester resins, such as polycaprolactone, or with polyamides or polycarbonates used in such quantities as not to alter the rheological properties of the aromatic polyester resin.

The aliphatic polyester resins may be used in percentages of up to 20–30 wt. %.

In the case of copolyethylene terephthalates comprising 4–15% by mols of isophthalic acid units, said copolyethylene terephthalates may be used in blends with polyethylene isophthalate in a quantity such that the quantity of isophthalic acid units in the blend is from 10–20% by mols.

The parisons used for the production of the bottles are produced by injection according to known methods. The volume and weight of the parison is selected on the basis of the volume of the bottle and the intended application.

The following Examples are provided by way of non-limiting illustration of the invention.

EXAMPLE 1

40 g parisons were produced with a Husky injection unit using copolyethylene terephthalate (CoPET) containing 10 wt. % of units derived from isophthalic acid (IPA), with intrinsic viscosity (IV) of 0.8 dl/g, obtained by solid-phase polycondensation of a COPET with IV of 0.6 dl/g with the addition of 0.04 wt. % of PMDA (the COPET with IV of 0.8 dl/g was vacuum dried at 140° C. for at least 12 hours). The parisons were then subjected to free blowing on a Sidel machine equipped with infrared heating lamps to heat the parisons to 110° C. The parisons were blown with air at a pressure of 3 bar. The resultant flexible bottles are particularly transparent; capacity was 10, 15, 30 liters. Bottles filled with 15 l of water can withstand a drop of 1.5 m without breaking. Larger capacity bottles can withstand filling, but not the 1.5 m drop.

The neck of the bottle was closable with a screw cap.

EXAMPLE 2

Example 1 was repeated with the sole difference that the blown bottles, while inflated to a pressure of 3 bar with air, were subjected to thermal stabilisation by being heated with an IR lamp so as to achieve a surface temperature of 160°–170° C. for 5–10 seconds.

The bottles stabilised in this manner can withstand hot filling at 90° C. for 5 minutes without suffering major distortion and are thus usable for hot-fill applications.

The same thermal stabilisation result is achieved by blowing the parison in a heated mould.

EXAMPLE 3

Example 1 was repeated, but in this case blowing the heated parison in a mould in which has been placed a paperboard box of a volume of 20 l.

Blowing gives rise to a container in which the bottle has assumed the geometry of the box.

Bottles obtained by blowing in rigid containers may be of very thin thickness (50 μm or less) since they need only withstand the pressure of the liquid contents and not substantially withstand impact stresses, which are absorbed by the container.

EXAMPLE 4

Example 1 was repeated, with the sole exception that the CoPET used with an IV of 0.6 dl/g was upgraded in the solid-state until an IV of 0.8 dl/g was achieved without using PMDA. The obtained parisons were blown under the same conditions as in Example 1, giving rise to bottles of a capacity of up to 30 l and more as in Example 1, but with slightly poorer drop strength properties; when filled with water, the bottle can withstand a drop of 1.5 m up to volumes of 10 l, breakage being observed at larger volumes.

COMPARISON EXAMPLE 1

The blowing process of Example 1 was used on a parison obtained from bottle grade PET (IV of 0.8 dl/g). When blown under said conditions, the PET forms containers of a capacity of 3–4 l at most. Attempts to blow the PET to produce larger volumes resulted in the container exploding.

COMPARATIVE EXAMPLE 2

Example 1 was repeated with the sole difference that the parisons were produced from pellets obtained by extruding 7.5 wt. % of poly-(m-xylylene adipamide) (produced by Mitsubishi Gas Chemical, Japan, having viscosity of 1000 Pa·s at 280° C. under shear rate of 100 sec$^{-1}$) with a blend obtained by extruding 86 wt. % of copolyethylene terephthalate containing 2 wt. % of isophthalic acid units having IV of 0.8 dl/g and 14 wt. % of polyethylene isophthalate containing 0.1 wt. % of PMDA.

The resultant 40 g parisons were blown under the same conditions as in Example 1, giving rise to bottles with a capacity of approx. 5 l which are flexible and liquid-fillable and may be used for soft drinks and similar applications.

When filled with 5 l of water, the bottles can withstand a drop of 1.5 m without breaking.

What is claimed is:

1. A flexible bottle capable of being filled with a liquid, where said bottle is comprised of an aromatic polyester resin with an intrinsic viscosity of 0.7 to 0.85 dl/g, said bottle being provided with a closable neck for filling/emptying of the liquid, wherein said bottle has no welded seams, wherein said bottle has a capacity of at least 2 liters, wherein the ratio between the capacity in liters and the weight in grams of the bottle, excluding the neck, is from 0.15 to 0.5 for capacities of up to 2 to 5 liters and from 0.2 to 1.5 for capacities greater than 5 liters and less than 40 liters, and wherein the weight of in grams of the bottle, excluding the neck, includes the weight of the sidewall of the bottle.

2. A bottle according to claim 1, in which the polyester resin is copolyethylene terephthalate in which from 2 to 20 mol % of the units derived from terephthalic acid are replaced by units derived from isophthalic acid and/or naphthalenedicarboxylic acids.

3. A bottle according to claim 1, in which the polyester resin is blended with an aliphatic polyester resin in a quantity less than 40 wt. % relative to the blend.

4. A bottle according to claim 1, wherein the bottle has a capacity of greater than 10 liters, and wherein the ratio between capacity in liters and weight in grams is between 0.8 and 1.1.

5. A bottle according to claim 1 wherein the distortion characteristics of the bottle are reduced by thermal stabilization of the bottle.

6. A bottle according to claim 1, obtained by means of free blowing in the absence of a mold of a parison of aromatic polyester resins having rheological properties such that the parison may be blown until the desired capacity relative to weight is obtained.

7. A bottle according to claim 6, in which the parison is obtained from a copolyethylene terephthalate with an intrinsic viscosity of 0.7 to 0.85 dl/g, in which from 10 to 15 mol % of terephthalic acid units have been replaced by units derived from isophthalic acid and/or naphthalenedicarboxylic acids.

8. A bottle according to claim 7, in which the intrinsic viscosity of the copolyethylene terephthalate is adjusted to values of 0.7–0.85 dl/g by means of solid phase polycondensation of a copolyethylene terephthalate with an intrinsic viscosity of less than 0.7 dl/g, and the copolyethylene terephthalate contains pyromellitic dianhydride and the pyromellitic dianhydride is present at a level less than 0.1 wt. %.

9. A bottle according to claim 1, in which the parison is blown inside a rigid container, the geometry of which it assumes.

10. A bottle according to claim 9, in which the container is a paperboard box.

11. A bottle according to claim 10, in which the parison is obtained from a copolyethylene terephthalate with an intrinsic viscosity of 0.7 to 0.85 dl/g, in which fromo 10 to 15 mol % of terephthalic acid units have been replaced by units derived from isophthalic acid and/or naphthalenedicarboxylic acids.

12. A bottle according to claim 11, in which the intrinsic viscosity of the copolyethylene terephthalate is adjusted to values of 0.7–0.85 dl/g by means of solid phase polycondensation of a copolyethylene terephthalate with an intrinsic viscosity of less than 0.7 dl/g, and the copolyethylene terephthalate contains pyromellitic dianhydride and the pyromellitic dianhydride is present at a level less than 0.1 wt. %.

13. A bottle according to claim 9, in which the container is a metal container.

14. A bottle according to claim 13, in which the parison is obtained from a copolyethylene terephthalate with an intrinsic viscosity of 0.7 to 0.85 dl/g, in which from 10 to 15 mol % of terephthalic acid units have been replaced by units derived from isophthalic acid and/or naphthalenedicarboxylic acids.

15. A bottle according to claim 14, in which the intrinsic viscosity of the copolyethylene terephthalate is adjusted to values of 0.7–0.85 dl/g, by means of solid phase polycondensation of a copolyethylene terephthalate with an intrinsic viscosity of less than 0.7 dl/g, and the copolyethylene terephthalate contains pyromellitic dianhydride and the pyromellitic dianhydrie is present at a level less than 0.1 wt. %.

16. A bottle according to claim 9, in which the parison is obtained from a copolyethylene terephthalate with an intrinisc viscosity of 0.7 to 0.85 dl/g, in which from 10 to 15 mol % of terephthalic acid units have been replaced by units derived from isophthalic acid and/or naphthalenedicarboxylic acids.

17. A bottle according to claim 16, in which the parison is obtained from a copolyethylene terephthalate with an intrinsic viscosity of 0.7–0.85 dl/g, in which from 10 to 15 mol % of terephthalic acid units have been replaced by units derived from isophthalic acid and/or naphthalenedicarboxylic acids.

18. A bottle according to claim 1, which is inserted into a container having sufficient integrity to withstand the mechanical stresses which the bottles are not capable of withstanding.

19. A bottle according to claim 18, in which the parison is obtained from a copolyethylene terephthalate with an intrinsic viscosity of 0.7 to 0.85 dl/g, in which from 10 to 15 mol % of terephthalic acid units have been replaced by units derived from isophthalic acid and/or naphthalenedicarboxylic acids.

20. A bottle according to claim 19, in which the intrinsic viscosity of the copolyethylene terephthalate is adjusted to values of 0.7–0.85 dl/g by means of solid phase polycondensation of a copolyethylene terephthalate with an intrinsic viscosity of less than 0.7 dl/g, and the copolyethylene terephthalate contains pyromellitic dianhydride and the pyromellitic dianhydride is present at a level of less than 0.1 wt. %.

* * * * *